United States Patent
Rizzo et al.

(10) Patent No.: US 10,343,660 B2
(45) Date of Patent: Jul. 9, 2019

(54) VEHICLE BRAKE CONTROL SYSTEM INCLUDING EBOOST REGULATED VOLTAGE CONTROL

(71) Applicant: GM Global Technology Operations LLC, Detroit, MI (US)

(72) Inventors: Michael D. Rizzo, White Lake, MI (US); Mark J. Rychlinski, Farmington Hills, MI (US); Paul S. Shaub, Detroit, MI (US); Anthony J. Rifici, West Bloomfield, MI (US); Phanu Amatyakul, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 69 days.

(21) Appl. No.: 15/595,277

(22) Filed: May 15, 2017

(65) Prior Publication Data
US 2017/0361824 A1 Dec. 21, 2017

Related U.S. Application Data (60) Provisional application No. 62/350,990, filed on Jun. 16, 2016.

(51) Int. Cl.
*B60T 8/1755* (2006.01)
*B60T 7/12* (2006.01)
(Continued)

(52) U.S. Cl.
CPC .......... *B60T 8/17558* (2013.01); *B60R 16/03* (2013.01); *B60T 7/042* (2013.01);
(Continued)

(58) Field of Classification Search
CPC . B60R 16/03; B60T 7/042; B60T 7/12; B60T 7/22; B60T 8/1755; B60T 8/17558; B60T 8/4059; B60T 13/663; B60T 13/662
See application file for complete search history.

(56) References Cited

U.S. PATENT DOCUMENTS

| 5,404,303 A * | 4/1995 | Pattantyus .......... B60T 8/17616 701/78 |
| 5,711,024 A * | 1/1998 | Wanke .................. B60T 8/1755 180/197 |

(Continued)

FOREIGN PATENT DOCUMENTS

| CN | 1250729 A | 4/2000 |
| CN | 102294994 A | 12/2011 |

(Continued)

OTHER PUBLICATIONS

JPO machine translation of JP 2002-171796 (original JP document published Jun. 14, 2002) (Year: 2002).*

(Continued)

*Primary Examiner* — Behrang Badii
*Assistant Examiner* — David A Testardi
(74) *Attorney, Agent, or Firm* — Cantor Colburn LLP (57) ABSTRACT

A vehicle includes at least one brake assembly configured to brake at least one wheel of the vehicle in response to an applied voltage. A power supply is in signal communication with the at least one brake assembly. The power supply is configured to operate in a first mode that outputs a first voltage and a second mode that outputs a second voltage greater than the first voltage. A brake control system is in signal communication with the at least one brake assembly and the power supply. The brake control system is configured to determine a driving state of the vehicle, and is configured to output a brake boost request signal to initiate the second mode of the power supply in response to detecting the driving state, wherein a braking response time of the at least one brake assembly is improved in response to applying the second voltage.

18 Claims, 2 Drawing Sheets

(51) Int. Cl.

| | | |
|---|---|---|
| *B60R 16/03* | (2006.01) | |
| *B60T 7/04* | (2006.01) | |
| *B60T 8/1761* | (2006.01) | |
| *B60T 8/32* | (2006.01) | |
| *B60T 13/12* | (2006.01) | |
| *B60T 13/74* | (2006.01) | |
| *B60T 7/22* | (2006.01) | |
| *B60T 13/66* | (2006.01) | |

(52) U.S. Cl.
CPC ........... *B60T 7/12* (2013.01); *B60T 7/22* (2013.01); *B60T 8/17616* (2013.01); *B60T 8/3265* (2013.01); *B60T 13/12* (2013.01); *B60T 13/662* (2013.01); *B60T 13/745* (2013.01); *B60T 8/3255* (2013.01); *B60T 13/746* (2013.01); *B60T 2201/022* (2013.01); *B60T 2201/03* (2013.01)

(56) References Cited

U.S. PATENT DOCUMENTS

| | | | | |
|---|---|---|---|---|
| 5,952,799 | A * | 9/1999 | Maisch | B60T 8/321 |
| | | | | 303/146 |
| 6,157,887 | A * | 12/2000 | Zittlau | B60T 7/042 |
| | | | | 303/122.03 |
| 6,913,326 | B1 | 7/2005 | Ohkubo et al. | |
| 8,645,003 | B2 | 2/2014 | Kim | |
| 2004/0107033 | A1 * | 6/2004 | Rao | B60R 21/013 |
| | | | | 701/45 |
| 2006/0195231 | A1 * | 8/2006 | Diebold | B60R 21/013 |
| | | | | 701/1 |
| 2011/0254361 | A1 * | 10/2011 | Scharmann | B60T 8/405 |
| | | | | 303/10 |
| 2012/0279814 | A1 * | 11/2012 | Liebfried | B60T 8/1755 |
| | | | | 188/110 |
| 2012/0326676 | A1 * | 12/2012 | Ahnfalk | B60R 16/03 |
| | | | | 322/17 |
| 2014/0368031 | A1 * | 12/2014 | Schmidt | B60L 11/18 |
| | | | | 307/10.7 |
| 2015/0042151 | A1 * | 2/2015 | Zimmermann | B60T 8/1755 |
| | | | | 303/3 |
| 2015/0185036 | A1 * | 7/2015 | Braeuchle | G08G 1/0112 |
| | | | | 701/538 |
| 2016/0311323 | A1 * | 10/2016 | Lee | B60K 37/06 |
| 2017/0080907 | A1 * | 3/2017 | Goto | B60T 7/22 |
| 2017/0346399 | A1 * | 11/2017 | Vincent | B60T 17/02 |

FOREIGN PATENT DOCUMENTS

| | | | |
|---|---|---|---|
| DE | 102009038805 A1 * | 3/2010 | ......... H02M 3/1584 |
| DE | 102014206136 A1 * | 11/2015 | |
| EP | 2505443 A1 * | 10/2012 | |
| JP | 2002171796 A * | 6/2002 | |
| JP | 2005261180 A * | 9/2005 | |
| JP | 2008289229 A * | 11/2008 | |

OTHER PUBLICATIONS

EPO machine translation of DE 102009038805 (original DE document published Mar. 4, 2010) (Year: 2010).*

EPO machine translation of EP 2505443 (original EP document published Oct. 3, 2012) (Year: 2012).*

EPO machine translation of DE 102014206136 (original DE document published Nov. 12, 2015) (Year: 2015).*

Office Action for Chinese Application No. 201710423209.2; Application Filing Date Jun. 7, 2017; dated May 13, 2019 (15 pages).

* cited by examiner

VEHICLE BRAKE CONTROL SYSTEM INCLUDING EBOOST REGULATED VOLTAGE CONTROL

CROSS-REFERENCE TO RELATED APPLICATIONS

The present application claims priority to U.S. Provisional Application No. 62/350,990, filed on Jun. 16, 2016, the contents of which are incorporated by reference herein in its entirety.

INTRODUCTION

Various non-limiting embodiments relate generally to automotive vehicles, and more particularly, to vehicle braking systems.

Automotive vehicle electric boost (eBoost) technology uses a brake pedal simulator to interpret driver brake command and then uses a motor to move a plunger to displace brake fluid to one or more brake assemblies (sometimes referred to in the technical field as brake corners) of the vehicle. Automotive vehicles include a regulated voltage control which may limit the voltage provided to the motor during a given driving condition. The limited voltage, however, can unnecessarily limit overall vehicle performance including, for example, braking performance.

SUMMARY

At least one non-limiting embodiment provides a vehicle comprising an internal combustion engine configured to generate drive torque that drives at least one wheel of the vehicle. At least one brake assembly is configured to brake the at least one wheel of the vehicle in response to an applied voltage. A power supply is in signal communication with the at least one brake assembly, and is configured to operate in a first mode that outputs a first voltage and a second mode that outputs a second voltage that is greater than the first voltage. A brake control system is in signal communication with the at least one brake assembly and the power supply. The brake control system is configured to output a voltage level increase request signal to initiate the second mode of the power supply in response to a detected driving state of the vehicle such that a braking response time of the at least one brake assembly is improved in response to applying the second voltage.

In addition to one or more of the features described herein, or as an alternative, further embodiments include, wherein the improved braking response time includes braking the vehicle according to a first braking response time when operating in the first mode, and braking the vehicle according to a second braking response time that is less than the first braking response time when operating in the second mode.

In addition to one or more of the features described herein, or as an alternative, further embodiments include, wherein the at least one brake assembly brakes the at least one wheel according to the first braking response time in response to receiving the first voltage output during the first mode, and brakes the at least one wheel according to the second braking response time in response to receiving the second voltage output during the second mode.

In addition to one or more of the features described herein, or as an alternative, further embodiments include, wherein the detected driving state of the vehicle includes a low-performance state indicated by a first wheel speed of the at least one wheel, and a high-performance state indicated by a second wheel speed of the at least one wheel that is greater than the first wheel speed.

In addition to one or more of the features described herein, or as an alternative, further embodiments include an electronic hardware controller in signal communication with the power supply and the brake control system. The controller is configured to selectively operate the power supply in the first mode and the second mode. The controller invokes the second mode in response to receiving the voltage level increase request signal from the brake control system.

In addition to one or more of the features described herein, or as an alternative, further embodiments include an object detection sensor configured to output an object detection signal in response to detecting an object located in proximity of the vehicle.

In addition to one or more of the features described herein, or as an alternative, further embodiments include, wherein the brake control system outputs the voltage level increase request signal in response to receiving the object detection signal, and the controller invokes the second mode in response to receiving the voltage level increase request signal.

According to another non-limiting embodiment, a brake control system installed on a vehicle comprises at least one sensor configured to measure a driving condition of the vehicle, and an electronic hardware controller in signal communication with a power supply of the vehicle. The power supply is configured to operate in a first mode that outputs a voltage having a first voltage level and a second mode that outputs a voltage having a second voltage level that is greater than the first voltage level. An electronic brake system (EBS) controller is in signal communication with the at least one sensor, the controller, and at least one brake assembly configured to brake the at least one wheel of the vehicle in response to an applied voltage. The first voltage level generated according to the first mode controls a first braking response time of the brake assembly and the second voltage level generated according to the second mode controls a second braking response time of the brake assembly that is less than the first braking response time.

In addition to one or more of the features described herein, or as an alternative, further embodiments include, wherein the EBS controller commands the controller to invoke the second mode in response to a driving condition exceeding a driving condition threshold.

In addition to one or more of the features described herein, or as an alternative, further embodiments include, wherein the driving condition is a speed of the vehicle.

In addition to one or more of the features described herein, or as an alternative, further embodiments include, wherein the EBS controller outputs the voltage level increase request signal in response to receiving an autonomous vehicle deceleration request.

In addition to one or more of the features described herein, or as an alternative, further embodiments include, wherein the autonomous vehicle deceleration request includes an object detection signal output, via an object detection sensor, in response to detecting an object located in proximity of the vehicle.

In addition to one or more of the features described herein, or as an alternative, further embodiments include, wherein the electronic control module invokes the second mode and delivers a maximum allowable voltage level to the at least one brake assembly when the object detection sensor detects the object.

According to yet another non-limiting embodiment, a method of controlling at least one brake assembly of a vehicle comprises generating a drive torque that drives at least one wheel of the vehicle, and selectively operating a power supply in a first mode and a second mode. The first mode outputs a first voltage during a first driving state of the vehicle and the second mode outputs a second voltage greater than the first voltage during a second driving state of the vehicle. The method further includes detecting, via a brake control system, the second driving state of the vehicle, and outputting a voltage level increase request signal to initiate the second mode of the power supply in response to detecting the second driving state. The second voltage generated during the second mode improves the braking response time of the at least one brake assembly.

In addition to one or more of the features described herein, or as an alternative, further embodiments include, wherein the improved braking response time includes braking the vehicle according to a first braking response time when operating in the first mode, and braking the vehicle according to a second braking response time that is less than the first braking response time when operating the second mode.

In addition to one or more of the features described herein, or as an alternative, further embodiments include braking the at least one wheel, via the at least one brake assembly, according to the first braking response time in response to receiving the first voltage output during the first mode, and braking the at least one wheel, via the at least one brake assembly, according to the second braking response time in response to receiving the second voltage output during the second mode.

In addition to one or more of the features described herein, or as an alternative, further embodiments include detecting the first driving state based on a first wheel speed, and detecting the second driving state based on a second wheel speed that is greater than the first wheel speed.

In addition to one or more of the features described herein, or as an alternative, further embodiments include invoking the second mode to output the second voltage level in response to receiving an autonomous vehicle deceleration request.

In addition to one or more of the features described herein, or as an alternative, further embodiments include, wherein the autonomous vehicle deceleration request includes an object detection signal output, via an object detection sensor, in response to detecting an object located in proximity of the vehicle.

In addition to one or more of the features described herein, or as an alternative, further embodiments include, wherein invoking the second mode includes delivering a maximum allowable voltage level to the at least one brake assembly in response to detecting the object.

The above features and advantages, and other features and advantages of the disclosure, are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Various non-limiting embodiments described herein provide a vehicle that includes one or more brake assemblies configured to brake a corresponding wheel of the vehicle in response to an applied voltage. The vehicle further includes a brake control system having an electronic boost (eBoost) regulated voltage system that can be operated according to fluid pressure, current level, or a combination of both. For example, the braking assemblies can include hydro-mechanical components that apply brake torque in response to a fluid pressure driven by a voltage-responsive motor. The brake assembly includes a motor that moves a plunger to displace brake fluid to the hydro-mechanical components. An amount of voltage applied to the motor controls a response time in which the motor drives fluid to each brake assembly.

The brake assemblies can also be implemented in a brake-by-wire system, where the brake assemblies include electro-mechanical components that apply brake torque in response to a current level. In a similar manner, the voltage applied to the brake assemblies controls the response time and level current for driving current-responsive components (e.g., e-calipers) of the brake assembly. A power supply or voltage supply is in signal communication with one or more brake assemblies. The power supply is configured to operate in a first mode that outputs a first voltage and a second mode that outputs a second voltage greater than the first voltage. A brake control system is in signal communication with the brake assemblies and the power supply. The brake control system is configured to determine a driving state of the vehicle, and is configured to output a brake boost request signal to initiate the second mode of the power supply in response to detecting the driving state, wherein a braking response time of the brake assembly is improved in response to applying the second voltage.

The eBoost regulated voltage system can operate to improve brake response time, and in turn, improve vehicle performance for stopping distance and performance driving which typically requires optimal braking performance. The eBoost regulated voltage system can also improve autonomous braking deceleration time which enhances tradeoffs between low and high speed collision mitigation along with tradeoffs between false object detection and deceleration response, e.g., the vehicle system has additional time to interpret object detection when deceleration time is improved.

Figure 1:
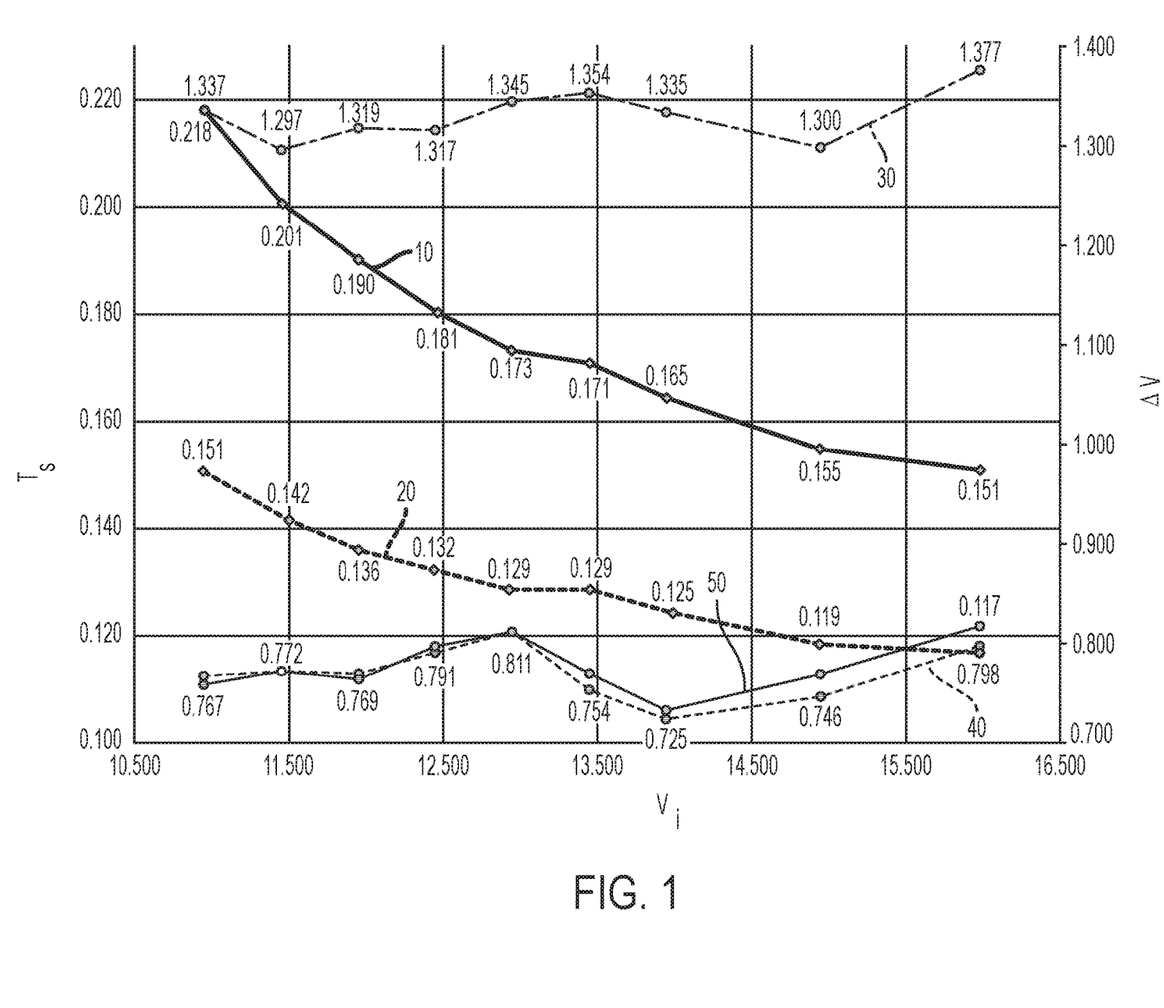
FIG. 1 illustrates the braking response time of a vehicle based on voltages applied to a brake assembly.

FIG. 1 is an example of a line graph describing an average eBoost voltage system response to an initial voltage delivered to the motor. It should be appreciated that the recitation of "bar" is defined using the system of physical unit (SI unit) pascal, namely: 1 bar equals 100,000 pascals (Pa), or 100 kilopascals (kPa). The graph illustrates a brake response time ($T_s$) plotted on a first vertical axis, an initial voltage (Vi) applied to a brake assembly plotted on a horizontal axis, and a voltage drop ($\Delta V$) of the brake assembly plotted on a second vertical axis.

The first signal curve 10 and the second signal curve 20 illustrate the time to develop brake assembly pressure at various voltages. The first curve 10 illustrates a time period for reaching a first target value (e.g., 100 bar), and the second curve 20 illustrates a time period for reaching a second target value (e.g., 62.2 bar). As illustrated, brake assembly pressure is generated quicker at higher voltages thereby improving brake response time. FIG. 1 also illustrates a max voltage drop curve 30, a first average voltage drop curve 40 indicating an average voltage drop with respect to the second target value (e.g., 62.2 bar), and second average voltage drop curve 50 indicating an average voltage drop with respect to the first target value (e.g., 100 bar).

Conventional vehicle regulated voltage systems typically limit the voltage output from the vehicle power supply based on criteria such as, for example, fuel economy. At least one embodiment described herein, however, provides an electronic brake control module (EBCM) that can recognize particular driving conditions of the vehicle (e.g., high performance driving conditions and/or dynamic braking conditions), and command the regulated voltage control to output an increased voltage level which can be delivered to the brake assemblies to improve braking response time.

Figure 2:
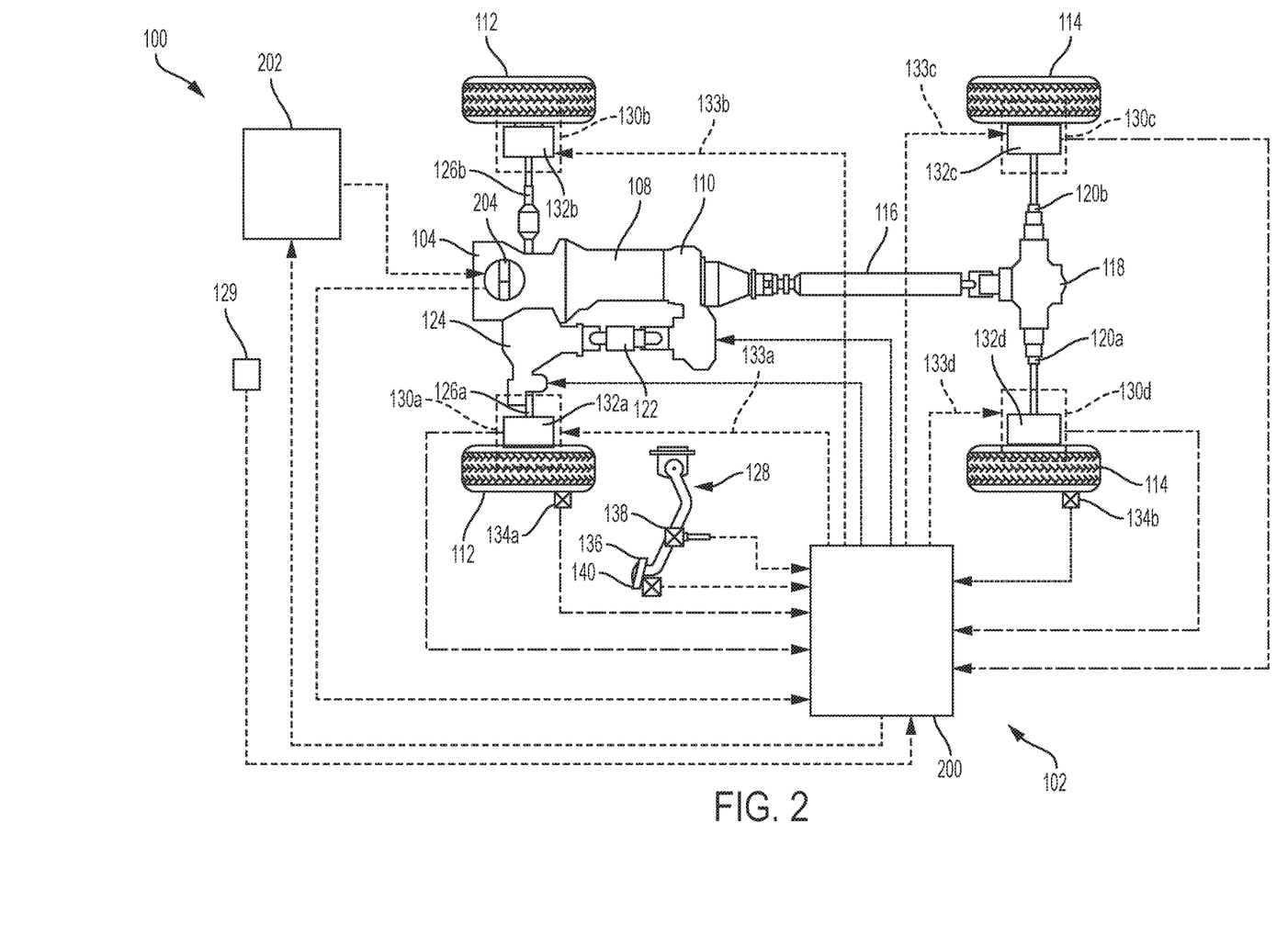
FIG. 2 illustrates a vehicle including a brake control system with regulated voltage control according to a non-limiting embodiment.

Turning now to FIG. 2, a vehicle 100 including a brake control system 102 configured to electronically control braking of the vehicle 100 is illustrated according to a non-limiting embodiment. The vehicle 100 is driven according to a powertrain system that includes an engine 104, a transmission 108 and a transfer case 110. The engine 104 includes, for example, an internal combustion engine 104 that is configured to generate drive torque that drives front wheels 112 and rear wheels 114 using various components of the vehicle driveline. Various types of internal combustion engines 104 may be employed in the vehicle 100 including, but not limited to, a diesel engine, a gasoline engine, and a hybrid-type engine that combines an internal combustion engine with an electric motor, for example.

The vehicle driveline may be understood to comprise various powertrain components, excluding the engine 104. According to a non-limiting embodiment, the drive torque is transferred to the transmission 108 via a rotatable crank shaft (not shown). Thus, the torque supplied to the transmission 108 may be adjusted in various manners including, for example, by controlling operation of the engine 104 as understood by one of ordinary skill in the art. In at least one embodiment, a drive shaft 116 delivers drive torque to a rear differential 118, and a front drive shaft 122 delivers drive torque to a front differential 124. Accordingly, the rear differential 118 balances drive torque delivered to the rear wheels 114 via the left/right rear axles 120a and 120b, while the front differential 124 balances drive torque delivered to the front wheels 112 via the left/right front axles 126a and 126b.

The brake control system 102 comprises a pedal assembly 128, brake assemblies 130a, 130b, 130c, and 130d, one or more actuator units 132a, 132b, 132c, and 132d, one or more one or more wheel sensors 134a and 134b, and an electronic brake system (EBS) controller 200. The EBS controller 200 has an electronic processor a memory. The memory stores one or more instructions that are executable by the processor.

The pedal assembly 128 is in signal communication with the EBS controller 200, and includes a brake pedal 136, one or more pedal travel sensors 138, and one or more pedal force sensors 140.

The EBS controller 200 is configured to detect brake pedal travel and/or braking force applied to the brake pedal 136 based on respective signals output from the pedal travel sensor 138, and the pedal force sensor 140. The pedal assembly 128 can be any combination of hardware and software that enables a component of the brake control system 102 to behave like a component not included in the fault tolerant brake control system 102. For example, the pedal assembly 128 can be a pedal emulator that behaves like a mechanical pedal of a hydraulic braking system. In at least one embodiment, the pedal assembly 128 may be operated exclusively through electronic wiring and software while omitting various mechanical and/or hydraulic components found in traditional pedal assemblies.

Brake pedal travel and/or braking force applied to the brake pedal 136 may be determined based on respective signals output from the pedal travel sensor 138, and the pedal force sensor 140 as understood by one of ordinary skill in the art. According to a non-limiting embodiment, the pedal force sensor 140 is implemented as a force/pressure transducer or other suitable force sensor configured or adapted to precisely detect, measure, or otherwise determine an applied pressure or force imparted to the brake pedal 136. The pedal travel sensor 138 may be implemented as a pedal position and range sensor configured or adapted to precisely detect, measure, or otherwise determine the relative position and direction of travel of brake pedal 136 along a fixed range of motion when the brake pedal 136 is moved.

The measurements or readings obtained by the pedal force sensor 140 and the pedal travel sensor 138 can be utilized in combination with one or more braking algorithms stored in a memory of an electronic controller. The data from the pedal force sensor 140 and/or pedal travel sensor 138 may also be used to calculate, select, and/or otherwise determine a corresponding braking request or braking event in response to the detected and recorded measurements or readings output from the wheel sensors 134a and 134b. Based on the determined braking request or braking event, the EBS controller 200 may perform various braking algorithms, speed calculations, distance-to-brake calculations, etc.

The wheel sensors 134a and 134b may provide various types of vehicle data including, but not limited to, speed, acceleration, deceleration, and vehicle angle with respect to the ground, and wheel slippage. In at least one embodiment, the vehicle brake control system 102 may include one or more object detection sensors 129 disposed at various locations of the vehicle 100. The object detection sensors 129 are configured to detect the motion and/or existence of various objects surrounding the vehicle including, but not limited to, surrounding vehicles, pedestrians, street signs, and road hazards. The EBS controller 200 may determine a request and/or need to slow down and/or stop the vehicle based on the data provided by the pedal unit 116, the wheel sensors 134a and 134b, and/or the object detection sensor 129. In response to determining the braking scenario, the EBS controller 200 communicates a braking command signal 133a, 133b, 133c, and 133d to one or more brake assemblies 130a, 130b, 130c, and 130d to slow or stop the vehicle 100. As described herein, the brake assemblies 130a, 130b, 130c, and 130d can include, for example, hydro-mechanical components that apply brake torque in response to a fluid pressure driven by a voltage-responsive motor.

In at least one embodiment, the EBS controller 200 outputs a low voltage data signal (e.g., a digital braking command signal 133a, 133b, 133c, and 133d) to an electrically-powered component (e.g., a motor and/or actuator) or a power circuit via a datalink. In at least one embodiment, one or more braking command signals 133a, 133b, 133c, and 133d are transmitted across one or more command signal transmission channels or lines to initiate operation of a driver that drives the actuator unit 132a, 132b, 132c, and 132d (e.g., motor, electrically-controlled caliper, etc.) of the brake assembly 130a, 130b, 130c, and 130d. The actuator unit 132a, 132b, 132c, and 132d may include various electronics capable of converting high-power generated from a power supply 204 into a high-power drive signal that drives the actuator unit 132a, 132b, 132c, and 132d (e.g., motor, e-caliper, etc.). The signal transmission channels may include a message-based communication bus such as, for example, a controller area network (CAN) bus.

In at least one embodiment, the EBS controller 200 includes programmable memory (not shown) and a microprocessor (not shown). In this manner, the EBS controller 200 is capable of rapidly executing the necessary control logic for implementing and controlling the actuator units 132a, 132b, 132c, and 132d using a brake pedal transition logic method or algorithm which is programmed or stored in memory.

The memory of EBS controller 200 may be preloaded or preprogrammed with one or more braking torque look-up tables (LUTs) (i.e. braking torque data tables readily accessible by the microprocessor in implementing or executing a braking algorithm). In at least one embodiment, the braking torque LUT stores recorded force measurements or readings of the pedal force sensor 140 and contains an associated commanded braking request appropriate for each of the detected force measurements as determined by the pedal force sensor 140. In a similar manner, the EBS controller 200 may store a pedal position LUT, which corresponds to the measurements or readings of the pedal travel sensor 138 and contains a commanded braking request appropriate for the detected position of pedal travel sensor 138.

In at least one embodiment, the EBS controller 200 may also include various power circuits configured to convert a constant high power input signal (e.g., non-switched high power input current) output from the power supply 204 into a high-power drive signal configured to drive various components of the brake assemblies 130a, 130b, 130c, and 130d. The power circuits include, but are not limited to, to, h-bridges, application-specific integrated circuits (ASICs), controller area network (CAN) transceivers or temperature or current sensors. In at least one embodiment, the actuator units 132a, 132b, 132c, 132d include a pulse width modulation (PWM) circuit coupled to an amplifier circuit so as to convert the constant high-power signal into a high-frequency switched high-power signal. The high-frequency switched high-current signal may have a frequency ranging from approximately 15 kilohertz to approximately 65 kHz, and may have a current value of approximately 0 amps to approximately 200 amps. The constant high-power input signals delivered by the power supply 204 may range from approximately 0 amps to approximately 200 amps.

The EBS controller 200 may output drive signals to one or more of the brake assemblies 130a, 130b, 130c, and 130d so as to drive various braking components (e.g., motors, calipers, etc.) For example, the drive signals output by the EBS controller 200 may drive a motor in the brake assemblies 130a, 130b, 130c, and 130d, which in turn drives fluid to generate brake pressure that controls the caliper. As the EBS controller 200 receives a greater voltage from the power supply 204, time needed to output the drive signals decreases and the time at which the brake assembly responds to an input voltage is reduced. In turn, the motor of the brake assembly is able to drive the fluid more quickly to apply brake pressure. In this manner, braking response time is improved. The power circuits may include a PWM module and amplifier circuit configured to convert the output from the power supply into a high-frequency switched high-current signal.

In at least one embodiment, the power circuits used to drive the various components of the brake assemblies 130a, 130b, 130c, and 130d are integrated in the brake assemblies themselves as opposed to within the EBS controller 200. In this scenario, the brake assemblies 130a, 130b, 130c, and 130d may receive the power necessary for driving the various braking components (e.g., motor, caliper, etc.) directly from the power supply 204 as opposed to the EBS controller 200.

The vehicle can further include a power control module (PCM) 202 configured to regulate the power supply 204. Although a separate PCM 202 is illustrated, it should be appreciated that the PCM 202 can be integrated into the EBS controller 200. The power supply 204 includes, for example, an alternator, a high-voltage auxiliary battery (not shown), etc. The power supply 204 is configured to operate in various modes that output different power levels (e.g., different voltage) for powering the vehicle 100. For example, the ECM 202 may operate the power supply 204 in a first mode to generate a first voltage and a second mode to generate a second voltage greater than the first voltage.

The ECM 202 is in signal communication with the EBS controller 200. The EBS controller 200 can determine various driving events such as, for example, high performance maneuvers and/or active autonomous vehicle deceleration requests and request the ECM 202 to increase battery voltage to the maximum allowable level. For example, in response to determining a particular driving event, (e.g., a high-performance driving (HPD) event, collision imminent braking (CIB) events such as, for example, braking requests indicated by the object detection sensor 29, etc.), the EBS controller 200 may output a voltage boost request signal to the ECM 202 requesting the power supply 204 be initiated into the second mode to generate the high voltage level. In response to receiving the voltage boost request signal, the ECM 202 initiates the second mode and controls the power supply 204 (e.g., the alternator) to increase voltage output to its highest available level. The increased voltage is then requested by the EBS controller 200, which in turn is used to generate the drive signals to the brake assemblies 130a, 130b, 130c, and 130d. The increased voltage received by the power supply 204 reduces the time needed for the EBS controller 200 to output the drive signals, and in turn the motor is able to drive the fluid to more quickly apply brake pressure. In this manner, braking response time is improved. This improved braking response time is realized in a similar manner when the power circuits are integrated directly in the brake assemblies 130a-130d.

The EBS controller 200 is configured to determine one or more driving events (eBoost driving events) which satisfy a condition for invoking the second mode of the power supply to output the increased voltage. In at least one embodiment, the EBS controller 200 receives various vehicle data provided by one or more sensors of the vehicle, applies the vehicle data to one or more algorithms that determine the eBoost driving events. Examples of the algorithms utilized by the EBS controller 200 (e.g., stored in memory of the EBS controller and executed by a local hardware processor) are described below.

The brake control system 102 is configured to request an increase to the vehicle's regulated voltage when operating during an eBoost driving event, e.g., dynamic braking or performance driving. A first example of an eBoost control algorithm executed by the braking system 102 is provided below:

Minimum System Voltage Request (eBoost Only) Global Enabling Conditions
  Power Moding
    The Minimum System Voltage Request (eBoost only) System shall function in Run Power Mode.
  Vehicle System Voltage
    In all cases, unless otherwise specified in another individual requirement for this feature, the Vehicle System Voltage shall be about 9 to about 16 V.
  Feature Enable/Disable
    The Brake System shall have two independent calibrations to individually enable 2 different MSVR Voltage Increase flags: K_MSVR_Int_DynBrak_Enabled and K_MSVR_Int_PerfDrive_Enabled Minimum System Voltage Request (eBoost Only) Operation

| Serial Data Inputs (input to (output by EBCM/EBS controller) | | | | | | |
|---|---|---|---|---|---|---|
| Source | Frame | Rate | Signal | Type | Range | Conversion |
| Internal | | | Driver Intended Brake Axle Torque | | | |
| Internal | | | Vehicle Speed | | | |
| Internal | | | Vehicle Deceleration | | | |
| Internal | | | ABS Active | BLN | | |
| Internal | | | ESC Active | BLN | | |
| Internal | | | Prefill Active | BLN | | |
| Internal | | | CIB Braking Active | BLN | | |
| Internal | | | Track Detect | BLN | | |

| Serial Data Outputs (output by EBCM/EBS controller) | | | | | | |
|---|---|---|---|---|---|---|
| Source | Frame | Rate | Signal | Type | Range | Conversion |
| HS | TBD | 100 msec or send on change | Brake Boost MSVR Voltage Increase Request (voltage level increase signal) Output from EBS controller | BLN | | |

Operation
The Brake System shall set Brake Boost MSVR Voltage Increase Request="False" during initialization.
The Brake System shall always set Brake Boost MSVR Voltage Increase Request="False" if K_MSVR_Int_DynBrak_Enabled="False" AND K_MSVR_Int_PerfDriveEnabled="False"
The Brake System shall set Brake Boost MSVR Voltage Increase Request="True" if ANY of the following are true:
MSVR Voltage Increase for Dynamic Braking flag="True":
  a) MSVR Voltage Increase for Performance Driving flag="True"
The Brake System shall set Brake Boost MSVR Voltage Increase Request="False" if ALL of the following are true:
  a) MSVR Voltage Increase for Dynamic Braking flag="False"
  b) MSVR Voltage Increase for Performance Driving flag="False"

Dynamic Braking (OBD Exception)
The Brake System shall always set MSVR Voltage Increase for DynBrak flag="False" if K_MSVR_Int_DynBrak_Enabled="False".
The Brake System shall set MSVR Voltage Increase for DynBrak flag="True" if K_MSVR_Int_DynBrak_Enabled="True" AND ANY of the following are true:
  a) Driver Intended Brake Axle Torque>K_MSVR_Int_DynBrak_DIBAT_Min
  b) ABS Active="True"
  c) ESC Active="True"
  d) Prefill Active="True"
  e) CIB Braking Active="True"
The Brake System shall set MSVR Voltage Increase for DynBrak flag="False" if ALL of the following are true for K_MSVR_Int_DynBrak_Inactive_Time:
  a) Driver Intended Brake Axle Torque<K_MSVR_Int_DynBrak_DIBAT_Min
  b) ABS Active="False"
  c) ESC Active="False"
  d) Prefill Active="False"
  e) CIB Braking Active="False"

Performance Driving (OBD Exception)
The Brake System shall set MSVR High Performance Driving Mode Counter=0 AND MSVR High Performance Driving Mode Timer=0 during initialization.
The Brake System shall ALWAYS set MSVR High Performance Driving Mode Counter=0 AND MSVR High Performance Driving Mode Timer=0 if K_MSVR_Int_PerfDrive_Enabled="False".
The Brake System shall start MSVR High Performance Driving Mode Timer if ANY of the following are true:
  a) Driver Intended Brake Axle Torque<K_MSVR_Int_PerfDrive_DIBAT_Min
  b) ABS active="False"
  c) Vehicle Deceleration<K_MSVR_Int_PerfDrive_Decel_Min {0.7G}
  d) Vehicle Speed<K_MSVR_Int_PerfDrive_Speed_Min {90 km/h}
The Brake System shall set HPD Flag="True" if ALL of the following become true:
  a) Driver Intended Brake Axle Torque>K_MSVR_Int_PerfDrive_DIBAT_Min
  b) ABS active="True"

c) Vehicle Deceleration>K_MSVR_Int_PerfDrive_Decel_Min d) Vehicle Speed>K_MSVR_Int_PerfDrive_Speed_Min {90 km/h}

The Brake System shall set HPD Flag="False" if ALL of the following become true:
  a) Driver Intended Brake Axle Torque<K_MSVR_Int_PerfDrive_DIBAT_Min
  b) ABS active="False"
  c) Vehicle Deceleration<K_MSVR_Int_PerfDrive_Decel_Min {0.7G}
  d) Vehicle Speed<K_MSVR_Int_PerfDrive_Speed_Min {90 km/h} OR HPD Flag="True"

The Brake System shall INCREMENT MSVR High Performance Driving Mode Counter AND set MSVR High Performance Driving Mode Timer=0 if HPD Flag TRANSITIONS from "False" to "True"

The Brake System shall DECREMENT MSVR High Performance Driving Mode Counter AND set MSVR High Performance Driving Mode Timer=0 if MSVR High Performance Driving Mode Timer>K_MSVR_Int_PerfDrive_Timer_Reset_Time The Brake System shall set MSVR High Performance Driving Mode Counter=0 If MSVR High Performance Driving Mode Counter<0

The Brake System shall set MSVR High Performance Driving Mode Counter=K_MSVR_Int_PerfDrive_Counter_Max If MSVR High Performance Driving Mode Counter>K_MSVR_Int_PerfDrive_Counter_Max The Brake System shall set MSVR Voltage Increase for Performance Driving flag="True" if ANY of the following are true:
  a) MSVR High Performance Driving Mode Counter=K_MSVR_Int_PerfDrive_Counter_Max
  b) Track Detect="True"

The Brake System shall set MSVR Voltage Increase for Performance Driving flag="False" if ALL of the following are true:
  a) MSVR High Performance Driving Mode Counter=0
  b) Track Detect="False"

Minimum System Voltage Request (eBoost only) Operation Calibrations are equal to false if the following are true:

A second example of an eBoost control algorithm executed by the braking system 102 is provided below:

Power Moding

The Minimum System Voltage Request (eBoost only) System shall function in Run Power Mode.

Vehicle System Voltage

In all cases, unless otherwise specified in another individual requirement for this feature, the Vehicle System Voltage shall be about 9 V to about 16 V.

Feature Enable/Disable

The Brake System shall have two independent calibrations to individually enable 2 different MVR Voltage Increase flags: K_MVR_Int_DynBrak_Enabled; and K_MVR_Int_PerfDrive_Enabled.

Minimum System Voltage Request (eBoost Only) Operation

| Serial Data Inputs | | | | | | |
|---|---|---|---|---|---|---|
| Source | Frame | Rate | Signal | Type | Range | Conversion |
| Internal | | | Driver Intended Brake Axle Torque and Validity -This could be Driver intended brake pressure base on supplier algorithm. Calibrations called out in pressure. | | | |
| Internal | | | Vehicle Speed | | | |
| Internal | | | Vehicle Deceleration | | | |
| Internal | | | ABS Active | BLN | | |
| Internal | | | ESC Active | BLN | | |
| Internal | | | Prefill Active | BLN | | |
| Internal | | | CIB Braking Active | BLN | | |
| Internal | | | Track Detect | BLN | | |

| Cal. # | Calibration Name | Range | Resolution | Initial (Default) | Units | Tolerance |
|---|---|---|---|---|---|---|
| | K_MSVR_Int_DynBrak_Enabled | | | | | |
| | K_MSVR_Int_PerfDrive_Enabled | | | | | |
| | K_MSVR_Int_DynBrak_DIBAT_Min | | | 70 bar | | |
| | K_MSVR_Int_DynBrak_Inactive_Time | | | 2 seconds | | |
| | K_MSVR_Int_PerfDrive_DIBAT_Min | | | | | |
| | K_MSVR_Int_PerfDrive_Decel_Min | | | 0.7 g | | |
| | K_MSVR_Int_PerfDrive_Speed_Min | | | 70 kph | | |
| | K_MSVR_Int_PerfDrive_Timer_Reset_Time | | | 10 minutes | | |
| | K_MSVR_Int_PerfDrive_Counter_Max | | | 2 | | |

| \multicolumn{6}{c}{Serial Data Outputs} |
| --- | --- | --- | --- | --- | --- |
| Source | Frame | Rate | Signal | Type Range | Conversion |
| HS | $0D1 | 10 | Brake Module Minimum Voltage Request | UNM 0-19.375 V | E = N * 0.625 |
| HS | $0D1 | 10 | Brake Module Minimum Voltage Request Alive Rolling Count | UNM 0-3 | E = N |

Operation

The Brake System shall set Brake Module Minimum Voltage Request="K_MVR_Normal_Voltage" during initialization.

The Brake System shall always set Brake Module Minimum Voltage Request="K_MVR_Normal_Voltage" if K_MVR_Int_DynBrak_Enabled="False" AND K_MVR_Int_PerfDriveEnabled="False".

The Brake System shall set Brake Module Minimum Voltage Request="K_MVR_Increase_Voltage" if ANY of the following are true:
  a) MVR Voltage Increase for Dynamic Braking flag="True"
  b) MVR Voltage Increase for Performance Driving flag="True"

The Brake System shall set Brake Module Minimum Voltage Request="K_MVR_Normal_Voltage" if ALL of the following are true:
  a) MVR Voltage Increase for Dynamic Braking flag="False"
  b) MVR Voltage Increase for Performance Driving flag="False"

Dynamic Braking (OBD Exception)

The Brake System shall always set MVR Voltage Increase for DynBrak flag="False" if K_MVR_Int_DynBrak_Enabled="False".

The Brake System shall set MVR Voltage Increase for DynBrak flag="True" if K_MVR_Int_DynBrak_Enabled="True" AND ANY of the following are true:
  a) Driver Intended Brake Axle Torque is Valid AND>K_MVR_Int_DynBrak_DIBAT_Min
  b) ABS Active="True"
  c) ESC Active="True"
  d) Prefill Active="True"
  e) CIB Braking Active="True"

The Brake System shall set MVR Voltage Increase for DynBrak flag="False" if ALL of the following are true for K_MVR_Int_DynBrak_Inactive_Time if:
  a) Driver Intended Brake Axle Torque<K_MVR_Int_DynBrak_DIBAT_Min, OR invalid
  b) ABS Active="False"
  c) ESC Active="False"
  d) Prefill Active="False"
  e) CIB Braking Active="False"

Performance Driving (OBD Exception)

The Brake System shall set MVR High Performance Driving Mode Counter=0 AND MVR High Performance Driving Mode Timer=0 during initialization.

The Brake System shall ALWAYS set MVR High Performance Driving Mode Counter=0 AND MVR High Performance Driving Mode Timer=0 if K_MVR_Int_PerfDrive_Enabled="False".

The Brake System shall start MVR High Performance Driving Mode Timer if ANY of the following are true:
  a) Driver Intended Brake Axle Torque is invalid
  b) Driver Intended Brake Axle Torque<K_MVR_Int_PerfDrive_DIBAT_Min
  c) ABS active="False"
  d) Vehicle Deceleration<K_MVR_Int_PerfDrive_Decel_Min {0.7G}
  e) Vehicle Speed<K_MVR_Int_PerfDrive_Speed_Min {90 km/h}

The Brake System shall set HPD Flag="True" if ALL of the following become true:
  a) Driver Intended Brake Axle Torque is Valid AND>K_MVR_Int_PerfDrive_DIBAT_Min
  b) ABS active="True"
  c) Vehicle Deceleration>K_MVR_Int_PerfDrive_Decel_Min
  d) Vehicle Speed>K_MVR_Int_PerfDrive_Speed_Min {90 km/h}

The Brake System shall set HPD Flag="False" if ALL of the following become true:
  a) Driver Intended Brake Axle Torque<K_MVR_Int_PerfDrive_DIBAT_Min
  b) ABS active="False"
  c) Vehicle Deceleration<K_MVR_Int_PerfDrive_Decel_Min {0.7G}
  d) Vehicle Speed<K_MVR_Int_PerfDrive_Speed_Min {90 km/h} OR HPD Flag="True"

The Brake System shall INCREMENT MVR High Performance Driving Mode Counter AND set MVR High Performance Driving Mode Timer=0 if HPD Flag TRANSITIONS from "False" to "True".

The Brake System shall DECREMENT MVR High Performance Driving Mode Counter AND set MVR High Performance Driving Mode Timer=0 if MVR High Performance Driving Mode Timer>K_MVR_Int_PerfDrive_Timer_Reset_Time.

The Brake System shall set MVR High Performance Driving Mode Counter=0 If MVR High Performance Driving Mode Counter<0.

The Brake System shall set MVR High Performance Driving Mode Counter=K_MVR_Int_PerfDrive_Counter_Max If MVR High Performance Driving Mode Counter>K_MVR_Int_PerfDrive_Counter_Max.

The Brake System shall set MVR Voltage Increase for Performance Driving flag="True" if ANY of the following are true:
  a) MVR High Performance Driving Mode Counter=K_MVR_Int_PerfDrive_Counter_Max.
  b) Track Detect="True"

The Brake System shall set MVR Voltage Increase for Performance Driving flag="False" if ALL of the following are true:
  a) MVR High Performance Driving Mode Counter=0
  b) Track Detect="False"

Minimum System Voltage Request (eBoost Only) Fault Detection and Response
  The Brake System shall always set Brake Module Minimum Voltage Request="K_MVR_Normal_Voltage" if eBoost System Status="No Boost".
Minimum System Voltage Request.
Brake Module Minimum Voltage Request has a QM ASIL rating.
Minimum System Voltage Request (eBoost only) Operation Calibrations are equal to false if the following parameters apply:

| Cal. # | Calibration Name | Range | Resolution | Initial (Default) | Units |
|---|---|---|---|---|---|
| 1 | K_MVR_Int_DynBrak_Enabled | True/False | NA | True | NA |
| 2 | K_MVR_Int_PerfDrive_Enabled | True/False | NA | True | NA |
| 3 | K_MVR_Normal_Voltage | 0-19.375 | 0.625 | 11.875 | Volts |
| 4 | K_MVR_Increase_Voltage | 0-19.375 | 0.625 | 14.375 | Volts |
| 5 | K_MVR_Int_DynBrak_DIBAT_Min | 0-255 | 1 | 70 | bar |
| 6 | K_MVR_Int_DynBrak_Inactive_Time | 0-25.5 | 0.1 | 2 | Sec |
| 7 | K_MVR_Int_PerfDrive_DIBAT_Min | 0-255 | 1 | 70 | bar |
| 8 | K_MVR_Int_PerfDrive_Decel_Min | 0-25.5 | 0.1 | 7 | m/s2 |
| 9 | K_MVR_Int_PerfDrive_Speed_Min | 0-255 | 1 | 70 | kph |
| 10 | K_MVR_Int_PerfDrive_Timer_Reset_Time | 0-25.5 | 0.1 | 10 | min |
| 11 | K_MVR_Int_PerfDrive_Counter_Max | 0-10 | 1 | 2 | count |

As described herein, a brake control system includes an eBoost regulated voltage system that can operate to improve brake response time, which in turn improves vehicle performance for stopping distance and performance driving. The eBoost regulated voltage system can also improve autonomous braking deceleration time which enhances tradeoff of low and high speed collision mitigation tradeoff between false object detection and deceleration response, e.g., the vehicle system has additional time to interpret object detection when deceleration time is improved.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller or system controller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While various non-limiting embodiments have been described with reference to exemplary embodiments, it will be understood by those skilled in the art that various changes may be made and equivalents may be substituted for elements thereof without departing from the scope of the disclosure. In addition, many modifications may be made to adapt a particular situation or material without departing from the essential scope thereof. Therefore, it is intended that the disclosure not be limited to the particular embodiments disclosed, but will include all embodiments falling within the scope of the application.

What is claimed is:

1. A vehicle comprising:
   at least one wheel;
   at least one brake assembly configured to brake the at least one wheel of the vehicle in response to an applied voltage;
   a power supply in signal communication with the at least one brake assembly, the power supply configured to operate in a first mode that outputs a first voltage and a second mode that outputs a second voltage that is greater than the first voltage;
   a brake control system in signal communication with the at least one brake assembly and the power supply, the brake control system including an electronic brake system (EBS) controller configured to output a voltage level increase request signal to initiate the second mode of the power supply in response to a detected driving state of the vehicle;
   an electronic power controller in signal communication with the power supply and the EBS controller, the power controller configured to command the power supply to invoke the second mode in response to receiving the voltage level increase request signal from the EBS controller;
   wherein the power supply outputs the second voltage to the EBS controller, and in response to receiving the second voltage the EBS controller reduces a time at which the applied voltage is delivered to the at least one brake assembly such that a braking response time of the at least one brake assembly is improved in response to the second voltage.

2. The vehicle of claim 1, wherein the improved braking response time includes braking the vehicle according to a first braking response time when operating in the first mode, and braking the vehicle according to a second braking response time that is less than the first braking response time when operating in the second mode.

3. The vehicle of claim 2, wherein the at least one brake assembly brakes the at least one wheel according to the first braking response time in response to receiving the first voltage output during the first mode, and brakes the at least one wheel according to the second braking response time in response to receiving the second voltage output during the second mode.

4. The vehicle of claim 1, wherein the detected driving state of the vehicle includes a low-performance state indicated by a first wheel speed of the at least one wheel, and a high-performance state indicated by a second wheel speed of the at least one wheel that is greater than the first wheel speed.

5. The vehicle of claim 1, further comprising an object detection sensor configured to output an object detection signal in response to detecting an object located in proximity of the vehicle.

6. The vehicle of claim 5, wherein the brake control system outputs the voltage level increase request signal in response to receiving the object detection signal, and the controller invokes the second mode in response to receiving the voltage level increase request signal.

7. A brake control system installed on a vehicle, the brake control system comprising:
- at least one sensor configured to measure a driving condition of the vehicle;
- an electronic hardware power controller in signal communication with a power supply of the vehicle, the power supply configured to operate in a first mode that outputs a voltage having a first voltage level and a second mode that outputs a voltage having a second voltage level that is greater than the first voltage level; and
- an electronic brake system (EBS) controller in signal communication with the at least one sensor, the power controller, and at least one brake assembly configured to brake at least one wheel of the vehicle in response to an applied voltage,
- wherein the first voltage level generated according to the first mode controls a first braking response time of the brake assembly and the second voltage level generated according to the second mode controls a second braking response time of the brake assembly that is less than the first braking response time,
- wherein the power controller is configured to command the power supply to invoke the second mode in response to receiving a voltage level increase request signal from the EBS controller,
- wherein the power supply outputs the second voltage to the EBS controller, and in response to receiving the second voltage the EBS controller reduces a time at which the applied voltage is delivered to the at least one brake assembly such that a braking response time of the at least one brake assembly is improved in response to the second voltage.

8. The brake control system of claim 7, wherein the driving condition is a speed of the vehicle.

9. The brake control system of claim 7, wherein the EBS controller outputs the voltage level increase request signal in response to receiving an autonomous vehicle deceleration request.

10. The brake control system of claim 9, wherein the autonomous vehicle deceleration request includes an object detection signal output, via an object detection sensor, in response to detecting an object located in proximity of the vehicle.

11. The brake control system of claim 10, wherein the electronic control module invokes the second mode and delivers a maximum allowable voltage level to the at least one brake assembly when the object detection sensor detects the object.

12. A method of controlling at least one brake assembly of a vehicle, the method comprising:
- driving at least one wheel of the vehicle;
- selectively operating a power supply in a first mode that outputs a first voltage during a first driving state of the vehicle and a second mode that outputs a second voltage greater than the first voltage during a second driving state of the vehicle;
- detecting, via a brake control system, the second driving state of the vehicle; and
- outputting, via an electronic brake system (EBS) controller, a voltage level increase request signal to initiate the second mode of the power supply in response to detecting the second driving state;
- outputting a control signal, via a power controller, to command the power supply to invoke the second mode in response to receiving a voltage level increase request signal from the EBS controller;
- outputting, via the power supply, the second voltage to the EBS controller; and
- in response to receiving the second voltage, the EBS controller reduces a time at which an applied voltage is delivered to the at least one brake assembly such that a braking response time of a brake assembly configured to brake the at least one wheel is improved in response to the second voltage.

13. The method of claim 12, wherein the improved braking response time includes braking the vehicle according to a first braking response time when operating in the first mode, and braking the vehicle according to a second braking response time that is less than the first braking response time when operating in the second mode.

14. The method of claim 13, further comprising braking the at least one wheel, via the at least one brake assembly, according to the first braking response time in response to receiving the first voltage output during the first mode, and braking the at least one wheel, via the at least one brake assembly, according to the second braking response time in response to receiving the second voltage output during the second mode.

15. The method of claim 14, further comprising detecting the first driving state based on a first wheel speed, and detecting the second driving state based on a second wheel speed that is greater than the first wheel speed.

16. The method of claim 15, further comprising invoking the second mode to output the second voltage level in response to receiving an autonomous vehicle deceleration request.

17. The method of claim 16, wherein the autonomous vehicle deceleration request includes an object detection signal output, via an object detection sensor, in response to detecting an object located in proximity of the vehicle.

18. The method of claim 17, wherein invoking the second mode includes delivering a maximum allowable voltage level to the at least one brake assembly in response to detecting the object.

\* \* \* \* \*